United States Patent
Chiang et al.

(10) Patent No.: US 11,637,341 B1
(45) Date of Patent: Apr. 25, 2023

(54) MULTI-PHASE ELECTROCHEMICAL CELLS AND RELATED SYSTEMS AND METHODS

(71) Applicant: Massachusetts Institute of Technology, Cambridge, MA (US)

(72) Inventors: Yet-Ming Chiang, Weston, MA (US); Andres Badel, Deerfield Beach, FL (US); Fei Wang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 66 days.

(21) Appl. No.: 17/175,543

(22) Filed: Feb. 12, 2021

Related U.S. Application Data

(60) Provisional application No. 62/976,730, filed on Feb. 14, 2020.

(51) Int. Cl.
| | |
|---|---|
| *H01M 12/06* | (2006.01) |
| *H01M 4/36* | (2006.01) |
| *H01M 4/38* | (2006.01) |
| *H01M 4/66* | (2006.01) |

(52) U.S. Cl.
CPC .......... *H01M 12/06* (2013.01); *H01M 4/368* (2013.01); *H01M 4/38* (2013.01); *H01M 4/663* (2013.01)

(58) Field of Classification Search
None
See application file for complete search history.

(56) References Cited

U.S. PATENT DOCUMENTS

| | | | |
|---|---|---|---|
| 4,071,660 | A | 1/1978 | Hart |
| 4,146,680 | A | 3/1979 | Carr et al. |
| 4,181,777 | A | 1/1980 | Spaziante et al. |
| 4,414,292 | A | 11/1983 | Kiwalle et al. |
| 4,534,833 | A | 8/1985 | Carr et al. |
| 2005/0244707 | A1* | 11/2005 | Skyllas-Kazacos .... H01M 8/20 429/105 |
| 2020/0044267 | A1* | 2/2020 | Perry ................... H01M 8/184 |

OTHER PUBLICATIONS

Xu et al. Chem Comm. 2018, 54, 11626-11629 (Year: 2018).*
Bamgbopa et al., Cyclable membraneless redox flow batteries based on immiscible liquid electrolytes: demonstration with all-iron redox chemistry. Electrochimica Acta. Feb. 13, 2018;267:41-50.
Xu et al., A membrane-free interfacial battery with high energy density. Chem Commun (Camb). Oct. 11, 2018;54(82):11626-11629.
[No Author Listed], ZBM2 Zinc-Bromine Flow Battery. Redflow Limited. Brisbane, Australia. Accessed Sep. 16, 2021 from <https://web.archive.org/web/20191013131930/https://redflow.com/products/redflow-zbm2/>, as available Oct. 13, 2019. 8 pages.
[No Author Listed], ZBB EnerStore™: Deep Discharge Zinc-Bromine Battery Module. Office of Energy Efficiency & Renewable Energy, U.S. Department of Energy. Accessed Oct. 1, 2021 from <https://web.archive.org/web/20170608234703/https://www.energy.gov/eere/amo/zbb-enerstore-deep-discharge-zinc-bromine-battery-module>, as available Jun. 8, 2017. 5 pages.

(Continued)

*Primary Examiner* — Lisa S Park
(74) *Attorney, Agent, or Firm* — Wolf, Greenfield & Sacks, P.C.

(57) ABSTRACT

Multi-phase electrochemical cells and related systems and methods are generally described.

20 Claims, 13 Drawing Sheets

(56) References Cited

OTHER PUBLICATIONS

[No Author Listed], Primus Power Homepage. Primus Power. Accessed Oct. 7, 2021 from <https://web.archive.org/web/20190904161152/http://primuspower.com/en/>, as available Sep. 4, 2019. 8 pages.

[No Author Listed], Finding new ways to store sunlight. World Wildlife Federation. Accessed Oct. 1, 2021 from <http://www.climatesolver.org/innovations/supplying-energy/power-bank-grid-storage>, as available Oct. 20, 2019. 1 page.

[No Author Listed], Duration Addition to electricity Storage (DAYS) Overview. Advanced Research Projects Agency—Energy (Arpa-e), U.S. Department of Energy. Accessed Oct. 1, 2021 from <https://web.archive.org/web/20201019191526/https://arpa-e.energy.gov/sites/default/files/documents/files/DAYS_ProgramOverview_FINAL.pdf>, as available Oct. 19, 2020. 12 pages.

* cited by examiner

Chlorine Electrode
$2Cl^- \rightleftharpoons Cl_2(g) + 2e^-$   $E^0 = 1.36V$ vs SHE
* Reaction occurs at a three-phase junction
* Increasing solubility of $Cl_2$ with lower temp.

Iron Electrode
$Fe^{2+} + 2e^- \rightleftharpoons Fe(s)$   $E^0 = -0.44V$ vs SHE

MULTI-PHASE ELECTROCHEMICAL CELLS AND RELATED SYSTEMS AND METHODS

RELATED APPLICATIONS

This application claims priority under 35 U.S.C. § 119(e) to U.S. Provisional Patent Application No. 62/976,730, filed Feb. 14, 2020, and entitled "Multi-Phase Electrochemical Cells and Related Systems and Methods," which is incorporated herein by reference in its entirety for all purposes.

GOVERNMENT SUPPORT

This invention was made with Government support under Grant No. DE-EE0007810 awarded by the Department of Energy. The Government has certain rights in the invention.

TECHNICAL FIELD

Multi-phase electrochemical cells and related systems and methods are generally described.

SUMMARY

Multi-phase electrochemical cells and related systems and methods are generally described. The subject matter of the present invention involves, in some cases, interrelated products, alternative solutions to a particular problem, and/or a plurality of different uses of one or more systems and/or articles.

In one aspect, an electrochemical cell is described, the electrochemical cell comprising a first region comprising a first electrode active material and a second region in electrochemical communication with the first region, the second region comprising a second electrode active material, wherein: the first region comprises a non-polar liquid; the first electrode active material comprises an electroactive species within the non-polar liquid, the electroactive species present in the non-polar liquid at a concentration of at least 1 mMol; and the second electrode active material comprises iron.

In one aspect, an electrochemical cell is provided. In some embodiments, the electrochemical cell comprises a first region comprising a first electrode active material; and a second region in electrochemical communication with the first region, the second region comprising second electrode active material; wherein the first region comprises a non-polar liquid; and the first electrode active material comprises an electroactive species within the non-polar liquid, the electroactive species present in the non-polar liquid at a concentration of at least 1 mMol (i.e., 1 millimole per liter).

In some embodiments, the electrochemical cell comprises a first region comprising a first liquid and a first electrode active material; and a second region comprising a second liquid and a second electrode active material, the second region in electrochemical communication with the first region; wherein the first electrode active material is an electroactive species present in the first liquid at a concentration of at least 1 mMol, and at least one phase boundary is present between the first region and the second region.

In certain embodiments, the electrochemical cell comprises a first electrode comprising a first liquid; and a second electrode comprising a second liquid in electrochemical communication with the first electrode, the second liquid being immiscible with the first liquid; wherein at least one of the first electrode and the second electrode comprises an electroactive molecular species present in the liquid at a concentration of at least 1 mMol.

Methods of using and/or fabricating electrochemical cells are also provided.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Certain aspects are related to electrochemical cells. In some embodiments, the electrochemical cell comprises at least one electrode in which electroactive species (e.g., a molecular species, such as at least one electroactive diatomic halogen and/or other molecular species) is present (e.g., dissolved) within a liquid of the electrode. Such arrangements of electroactive material can allow for relatively easy and/or safe storage of the electroactive material. In some embodiments, the two electrodes of the electrochemical cell can be separated by at least one phase boundary (e.g., at least one liquid-liquid phase boundary). For example, in some embodiments, the two electrodes of the electrochemical cell can be immiscible with each other and/or with an intermediate liquid phase between the electrodes. The use of phase boundaries between the electrode liquids can allow for the design of membraneless cells, which can be relatively simple to operate and/or maintain.

Figure 1:
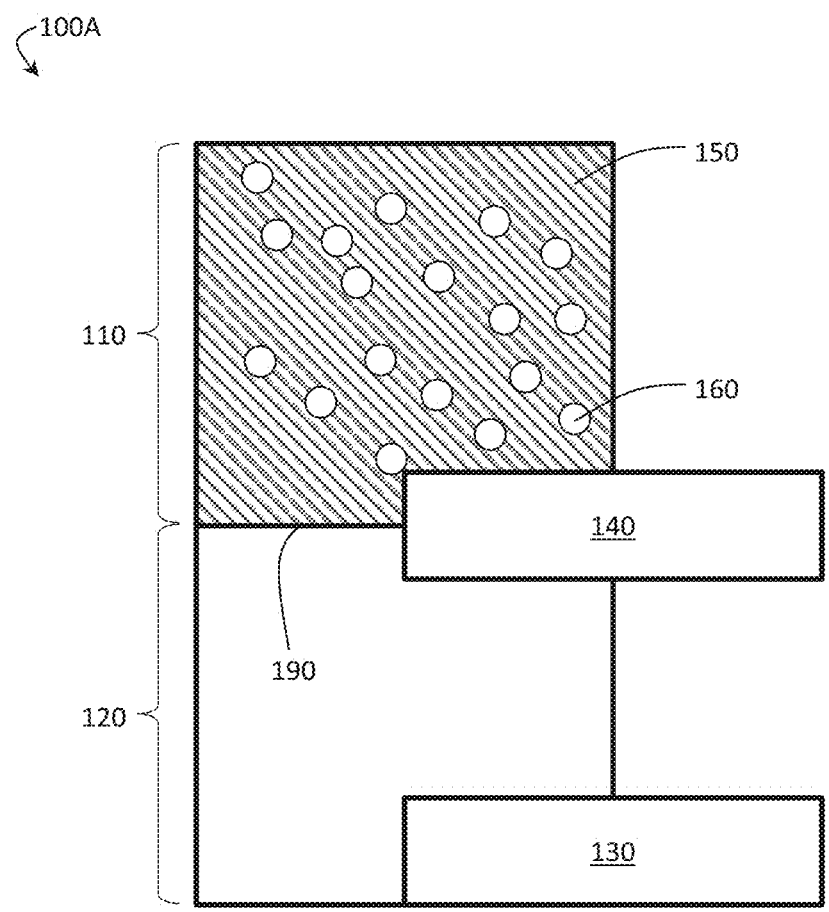
FIG. 1 is a cross-sectional schematic illustration of an electrochemical cell, according to certain embodiments.

In some embodiments, the electrochemical cell comprises a first region comprising a first electrode active material and a second region comprising a second electrode active material. The first region can be a first electroactive region, and the second region can be a second electroactive region having the opposite polarity of the first electroactive region. For example, in some cases, the first region can be a cathode region, and the second region can be an anode region. In some embodiments, the first region can be an anode region, and the second region can be a cathode region. The first region can be in electrochemical communication with the second region. One example of such an electrochemical cell is shown in FIG. 1, in which electrochemical cell 100A comprises first region 110 and second region 120, which are in electrochemical communication with each other.

In some embodiments, the first region comprises a liquid. The liquid can be, in some embodiments, a non-polar liquid. For example, in FIG. 1, first region 110 comprises liquid 150, which can be a non-polar liquid. The terms "polar" and "non-polar" are given their ordinary meanings in the field of chemistry. In some embodiments, the non-polar liquid has a dielectric constant of less than 15.

In certain embodiments, the first electrode active material comprises an electroactive species (e.g., a molecular species, such as a dissolved gas) within the liquid of the first electrode. Referring to FIG. 1, for example, electrochemical cell 100A comprises electroactive species 160 (e.g., a molecular species) within (e.g., dissolved within) liquid 150. In accordance with certain embodiments, during at least a portion of time during charge and/or discharge of the electrochemical cell, the electrode comprises the electroactive species (e.g., a molecular species, such as a dissolved electroactive gas). In some embodiments, when the cell is fully discharged, there is no (or substantially no) electroactive species (e.g., molecular species, such as a dissolved electroactive gas) within the first electrode. In some such embodiments, after at least partially charging the cell, the electroactive species may be present within the first electrode.

A variety of electroactive species (e.g., molecular species) can be present within liquid (e.g., non-polar liquid) of the first region of the electrochemical cell. Non-limiting examples include a diatomic halogen (e.g., $F_2$, $Cl_2$, $Br_2$, and/or $I_2$), oxygen ($O_2$), carbon dioxide ($CO_2$), and/or carbon monoxide (CO). In some embodiments, the electroactive species (e.g., molecular species) is a dissolved gas. As would be understood by those of ordinary skill in the art, the term dissolved gas, in this context, refers to material that, at the ambient temperature and pressure of operation of the electrochemical cell, the most stable phase of the material in its pure form is a gas. In some embodiments, the electroactive species comprises a material that is a gas at a temperature of 298 K and a pressure of 1 bar. In some such embodiments, the electrochemical cell may advantageously provide improved handling of the dissolved gas by avoiding direct contact with the gas when preparing and/or operating the electrochemical cell, and by avoiding the need to compress the gas at elevated pressures for more compact storage (including compressing said gas to a condensed phase such as liquid or solid). The electrochemical cell can be prepared with little (e.g., less than 1 mMol, less than 0.5 mMol, less than 0.1 mMol) or no dissolved gas present (e.g., prior to operation of the electrochemical cell), and the dissolved gas may be formed (e.g., in situ) during operation of the electrochemical cell. In such an embodiment, an ionic species related to the dissolved gas may be present in a region of the electrochemical cell (e.g., the second region), and, upon a redox event, the ionic species related to the dissolved gas may react to form the dissolved gas in another region of the electrochemical cell (e.g., the first region). However, it should be understood that, in other embodiments, the electrochemical cell may contain at least some (e.g., at least 1 mMol) dissolved gas in the first region prior to operation of the electrochemical cell.

A variety of liquids can be used within the first region of the electrochemical cell. In some embodiments, the liquid can be a non-polar liquid such as $CCl_4$, $CS_2$, chloroform, dichloromethane, ethylbenzene, chlorotoluene (e.g., (2-)chlorotoluene), toluene, trichlorobenzene (e.g., (1,2,4)-trichlorobenzene), dichlorobenzene, titanium tetrachloride, benzene, tetrachloroethylene, heptane, hexachloro-butadiene (e.g., hexachloro-(1,3)-butadiene), and/or chromyl chloride. Other liquids could also be used.

In some embodiments, a first electrode may be within the first region, and a second electrode (e.g., iron) may be within the second region. For example, in some embodiments, first region 110 in FIG. 1 can contain a first electrode and second region 120 can contain a second electrode.

In some embodiments, the electroactive species (e.g., electroactive gas) present in the liquid of the first region of the electrochemical cell is present at a relatively large concentration. In some embodiments, the electroactive species is present in the liquid (e.g., the non-polar liquid) at a concentration of at least 1 mMol (and/or, in some embodiments, at least 10 mMol, 100 mMol, 1000 mMol, or more). In some embodiments, the electroactive species is present in the liquid at or near (e.g., within 80%, within 90%, within 95%, or within 99% of) its solubility limit.

In certain embodiments, the electroactive species in the liquid of the first region is substantially absent from the second region (e.g., containing the second electrode). For example, referring back to FIG. 1, in some embodiments in which first region 110 contains liquid 150 containing electroactive species 160, electroactive species 160 can be substantially absent from second region 120. In certain embodiments in which the first region comprises a first liquid and the second region comprises a second liquid, an electroactive species within the first liquid can be substantially absent from the second liquid. In some such embodiments, an electroactive species within the second liquid can be substantially absent from the first liquid. A species that is in one region (the "predominant" region) is considered to be substantially absent from the other region (the "lean" region) when the molar ratio of the amount of the species within the predominant region to the amount of the species within the lean region is at least 19:1. In some embodiments, the molar ratio of the amount of the species within the predominant region to the amount of the species within the lean region is at least 50:1; at least 100:1; at least 1000:1; at least $1\times10^6$:1; at least $1\times10^8$:1, at least $1\times10^{10}$:1; or more.

In some embodiments, the second region, like the first region described above, can comprise a liquid. In some such embodiments, the first region contains a first electrode comprising a first liquid, and the second region contains a second electrode comprising a second liquid. The first and second liquids can be in electrochemical communication with each other. In some embodiments, the liquid of the first region is immiscible with the liquid of the second region. For example, referring back to FIG. 1, in some embodiments, first region 110 contains a non-polar liquid, and second region 120 contains a polar liquid (e.g., water) that is in electrochemical communication with first the non-polar liquid and that is immiscible with the non-polar liquid.

The use of two liquids is not required, however, and in other embodiments, one electrode can comprise a liquid and the other electrode can be a non-liquid (e.g., a solid). For example, in some embodiments, first region 110 contains a liquid electrode in which an electroactive gas is dissolved, and second region 120 contains a solid electrode.

In some embodiments, the second electrode active material within the second region comprises iron. The iron can be an ionic form of iron (e.g., $Fe^{2+}$, $Fe^{3+}$), including an associated salt containing iron (e.g., $FeCl_2$, $FeCl_3$), and/or a metallic form of iron, including an iron metal electrode. In some such embodiments, iron may advantageously reduce or eliminate the formation of metal dendrites, which could result in undesired short circuiting of the electrochemical cell. However, a variety of electrode active materials can be used within the second region (e.g., the region that is opposite the region containing the dissolved electrochemically active gas). In some embodiments, the electrode active material within the second region comprises a metal that can undergo electroplating and stripping. Non-limiting examples include Zn, Mg, Al, Ca, Li, Na, K, Rb, Cs, Fr, Bi, Cu, Sn, Pb, Ag, Au, Cr, Pt, Cd, Te, Pd, Co, Ti, Mn, La, Sr, Eu, Ra, Zr, Y, Sc, and/or V. In some embodiments, these materials are present in solid form. In other embodiments, the region in which these materials are present comprises a liquid (e.g., a polar liquid, such as water) within which these materials are dissolved.

In some embodiments, the electrochemical cell further comprises an electronically conductive material between the first region and the second region. For example, referring to FIG. 1, electrochemical cell 100A comprises electronically conductive material 140 between first region 110 and second region 120. The electronically conductive material can be, in some embodiments, a current collector. In some embodiments, the electronically conductive material has an electronic conductivity of at least $10^2$ S/cm, at least $10^4$ S/cm, at least $10^6$ S/cm, or higher.

In some embodiments, the electronically conductive material is in contact with the first and second electrode regions, for example, when the first and second electrode regions are relatively electronically insulating. Accordingly, in some such embodiments in which the electronically conductive material is between and in contact with the first electrode and the second electrode, the first region can be electronically insulating. For example, in some such embodiments, the electronic conductivity of the first region (e.g., of the liquid within the first region) is less than $10^{-6}$ S/cm, less than $10^{-8}$ S/cm, or less than $10^{-10}$ S/cm. In addition, in some such embodiments in which the electronically conductive material is between and in contact with the first electrode and the second electrode, the second region can be electronically insulating. For example, in some such embodiments, the electronic conductivity of the second region (e.g., of the liquid within the second region) is less than $10^{-6}$ S/cm, less than $10^{-8}$ S/cm, or less than $10^{-10}$ S/cm.

In some embodiments, the electrochemical cell comprises a second electronically conductive material. For example, in FIG. 1, electrochemical cell 100A comprises second electronically conductive material 130. The second electronically conductive material can be, for example, a second current collector. In some embodiments, the second electronically conductive material can comprise or be a solid precipitate of an electrochemical reaction that occurs within the second region (e.g., second region 120 in FIG. 1).

A variety of materials can be used for the electronically conductive material that is between the first and second regions. Non-limiting examples include carbon (e.g., graphite, carbon black, etc.), a metal, a metal oxide, a metal carbide, a metal nitride, and the like. The electronically conductive material in between the first and second regions may comprise one or more electronically conductive materials and may be a mixture of electronically conductive and electronically insulating materials, including composite materials. The electronically conductive material may be substantially dense or porous and may be in the form of a sheet or plate, a mesh, a foam, a porous sintered body, or a layer of electrically-connected (also referred to as electrically percolating) particles. In some embodiments, the electronically conductive material is selected or configured to have a density in between that of the first electrode region and the second electrode region. In some embodiments, the electronically conductive material is allowed to reside in between the first and second electrodes due to its intermediate density. In some embodiments, the density of the electronically conductive material is a composite material adjusted to a desired density by comprising porous particles of controlled buoyancy, or a composite material in which at least one electronically conductive material is joined to at least another material of lower or higher density in order to adjust the density of the composite. In some embodiments, the electronically conductive material has at least two layers. In some embodiments, the electronically conductive material also comprises a catalyst material that lowers the overpotential for a redox reaction with one or both of the first electrode and the second electrode.

In some embodiments, there is no membrane between the first electrode region and the second electrode region. For example, in FIG. 1, there is no membrane between first region 110 and second region 120.

In some embodiments, when the electrochemical cell is cycled, a product of an electrochemical reaction of the gas dissolved within the liquid of the first region (e.g., a non-polar liquid) has a relatively low solubility (e.g., a solubility of less than 1 g/L, less than 0.1 g/L, less than 0.01 g/L, less than 0.001 g/L, or less at 20° C.) in the liquid of the first region.

In some embodiments, when the electrochemical cell is subjected to a charge/discharge cycle, the second electrode active material is precipitated and dissolved. For example, in some embodiments, the second electrode active material can be precipitated during charge and dissolved during discharge. By way of illustration and not limitation, the second electrode active material may be or comprise iron. In some such embodiments, iron metal may precipitate during charging and an ionic iron species (e.g., $Fe^{2+}$, $Fe^{3+}$) may be formed during discharge.

In some embodiments, the product of an electrochemical reaction of the electrochemical cell is a decomposition product of the electroactive species within the liquid of the first region (e.g., the non-polar liquid of the first region). For example, in some embodiments, the gas dissolved within the non-polar liquid comprises $Cl_2$, and the product of the electrochemical reaction is $Cl^-$.

In some embodiments, the electroactive species is present in the first region as a molecular species, and the second region comprises a corresponding metal salt and/or a corresponding solubilized ion. In this context, a "corresponding metal salt" is a metal salt that includes at least one atom that is also present in the molecular species. To illustrate, if the molecular species in the first region is $Cl_2$, then any chloride salt (including, but not limited to, $ZnCl_2$, $FeCl_2$) would constitute a corresponding metal salt, since both the molecular species and the corresponding metal salt would include Cl atoms. Similarly, in this context, a "corresponding solubilized ion" is a solubilized ion of an atom that is also present in the molecular species. To illustrate, if the molecular species in the first region is $Cl_2$, then $Cl^-$ would constitute a corresponding solubilized ion. In some embodiments, the corresponding solubilized ion is a corresponding solubilized anion. In some such embodiments, the corresponding solubilized ion is an anion of F, Cl, Br, and/or I.

In some embodiments, the electroactive species in present in the first region as a molecular species, and the second region comprises a corresponding metal salt that comprises at least one of Zn, Fe, Mg, Al, Ca, Li, Na, K, Rb, Cs, Fr, Bi, Cu, Sn, Pb, Ag, Au, Cr, Pt, Cd, Te, Pd, Co, Ti, Mn, La, Sr, Eu, Ra, Zr, Y, Sc, and/or V.

While FIG. 1 shows an embodiment in which the first and second regions are arranged vertically, one stacked on top of the other, other embodiments are also possible. For example, in electrochemical cell 100B of FIG. 2, the first and second regions occupy two parts of an H-cell. In addition, while FIG. 1 shows the first region on top of the second region, in other embodiments, the second region can be on top of the first region.

Figure 3:
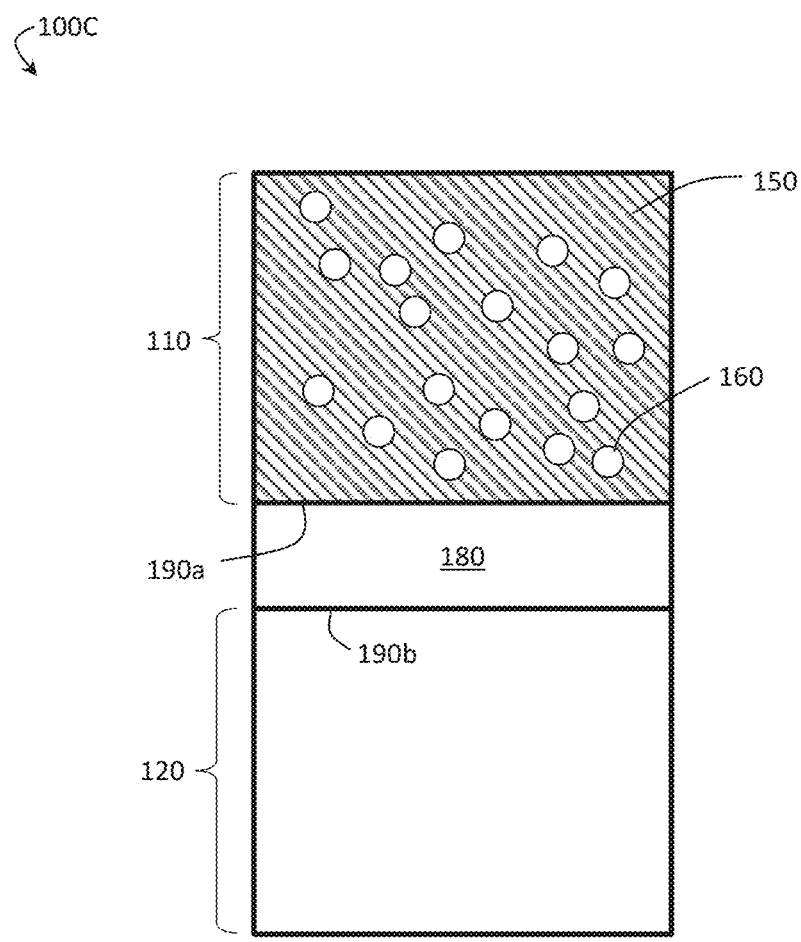
FIG. 3 is a cross-sectional schematic illustration of an electrochemical cell, according to certain embodiments.

In yet another embodiment, the first and second regions can be separated by an additional liquid. For example, in some embodiments, the first region comprises a liquid, and the second region comprises a liquid. The liquids of the first and second regions can be separated by a third liquid that is immiscible with both the liquid of the first region and the liquid of the second region. In one set of embodiments, the first region comprises a non-polar liquid within which the first electrode active material is dissolved, the second region comprises a non-polar liquid, and the electrochemical cell further comprises a polar liquid between the non-polar liquid of the first region and the non-polar liquid of the second region. One such embodiment in shown in FIG. 3, in which electrochemical cell 100C comprises first region 110 comprising a liquid (e.g., a non-polar liquid), second region 120 comprises a liquid (e.g., a non-polar liquid) and liquid 180 (which can be a polar liquid, such as water). In FIG. 3, liquid 180 is immiscible with the liquid within region 110 and the liquid within region 120 such that three phases are maintained. Electrochemical cell 100C in FIG. 3 could also include a first electronically conductive material and a second electronically conductive material (e.g., as shown in FIG. 1), although such materials are not illustrated in FIG. 3 for purposes of clarity.

In some embodiments, at least one phase boundary is present between the first region and the second region. The term phase boundary is used herein to refer to a boundary between two distinct phases. Examples of phase boundaries include liquid-liquid phase boundaries (which are generally present, for example, between immiscible fluids), liquid-solid phase boundaries, and the like. In some embodiments, there is at least one liquid-liquid phase boundary between the first region and the second region. For example, in some embodiments, the first region comprises a first liquid, and the second region comprises a second liquid that is immiscible with the first liquid. In some such embodiments, the first and second liquid are in contact with each other such that a liquid-liquid phase boundary is established between the first liquid and the second liquid. To illustrate with reference back to FIG. 1, in some embodiments, first region 110 comprises a first liquid, and second region 120 comprises a second liquid that is immiscible with the first liquid. In such cases, a liquid-liquid phase boundary (e.g., at interface 190 in FIG. 1) is established between the first liquid and the second liquid. A similar liquid-liquid phase boundary can be present in the embodiment illustrated in FIG. 2.

In certain embodiments, neither of the liquid within the first region and the liquid within the second region are soluble in the other in an amount of more than 10 mg/mL, more than 1 mg/mL, more than 0.1 mg/mL, more than 0.01 mg/mL, or more than 0.001 mg/mL at 20° C.

In some embodiments, multiple phase boundaries (e.g., multiple liquid-liquid phase boundaries) can be present between the first region and the second region. For example, in some embodiments, the electrochemical cell comprises an intermediate liquid between the first region and the second region, wherein the intermediate liquid is immiscible with the liquid in the first region and the liquid in the second region. One such embodiment is shown in FIG. 3, in which intermediate liquid 180 is immiscible with the liquid of the first region and the liquid of the second region. In FIG. 3, the first liquid within region 110 and intermediate liquid 180 establish first liquid-liquid phase boundary 190a. In addition, in FIG. 3, the second liquid within region 120 and intermediate liquid 180 establish second liquid-liquid phase boundary 190b.

In certain embodiments, neither of the liquid within the first region and the intermediate liquid are soluble in the other in an amount of more than 10 mg/mL, more than 1 mg/mL, more than 0.1 mg/mL, more than 0.01 mg/mL, or more than 0.001 mg/mL at 20° C. In certain embodiments, neither of the liquid within the second region and the intermediate liquid are soluble in the other in an amount of more than 10 mg/mL, more than 1 mg/mL, more than 0.1 mg/mL, more than 0.01 mg/mL, or more than 0.001 mg/mL at 20° C.

In certain embodiments, the liquid of the second region has a higher density than the liquid of the first region. The density difference can increase the stability of the liquid-liquid interface between the two regions. In some embodiments, the liquid of the second region has a density that is at least 1.1, at least 1.25, at least 1.5, or at least 2 times the density of the liquid of the first region.

In some embodiments, the density of one and/or both liquid regions is altered by the addition of one or more dissolved electrochemically inactive or partially active species (e.g., an additive) in order to achieve a desired difference in density between the two regions. Said dissolved inactive or partially active species may be, for example, a polymer, a co-solvent, or an organic or inorganic salt, and may be polar or non-polar. In certain instances where said species is a salt, said salt can be selected so that one or both of the cation and anion are, respectively, not reduced or not oxidized within the operating electrochemical potential range of the electrochemical cell. In certain embodiments, water-soluble polymers can be added to an aqueous region. Non-limiting examples include polyethylene glycol, polyvinyl pyrrolidone, xantham gum, pectins, polyvinyl alcohol, and/or polyacrylic acid. In certain embodiments, co-solvents such as heptane, benzene, toluene, chloroform, isopropyl alcohol, ethanol, methanol, and/or acetone can be added to a region to change its density. Other co-solvents could also be used. In certain embodiments, organic or inorganic salts may be added to a region. Non-limiting examples include ammonium bromide, ammonium nitrate, calcium bromate, calcium chlorate, cobalt chlorate, cobalt iodide, iron perchlorate, iron dichloride, lithium chlorate, nickel chlorate, nickel iodide, nickel bromide, potassium acetate, silver nitrate, silver perchlorate, sodium perchlorate, zinc chloride, zinc chlorate, zinc bromide, and/or zinc iodide.

In certain embodiments, at least one of the liquids within the electrochemical cell can be operated as a "flow electrode." That is to say, the liquid can be transported into and out of an electroactive zone during at least a portion of time during charging and/or discharging of the electrochemical cell. In some embodiments, the first and/or second liquid(s) within the electrochemical cell can remain within the electroactive zones of the electrochemical cell during charge and discharge. In some embodiments, the electrochemical cell is operated as a redox flow battery (in which both electrodes are flow electrodes), as a hybrid battery (in which one electrode is a flow electrode and the other electrode remains contained in its electroactive zone during charge and discharge), or as a stationary battery (in which both electrodes remain contained within their respective electroactive zones during charge and discharge).

In certain embodiments, the devices described herein can be used as metal-halogen batteries (e.g., a Zn—$Cl_2$ battery, a Zn—$Br_2$ battery, etc.). For example, in some cases, one electrode (e.g., the anode) may include Zn (e.g., anode: $Zn^{2+}+2e^- \rightleftharpoons Zn(s)$; $E^°=-0.76V$ vs SHE) and a second electrode (e.g., the cathode) may include chlorine (e.g., cathode: $2Cl^- \rightleftharpoons Cl_2(g)+2e^-$; $E^°=1.36V$ vs SHE) with an overall thermodynamic cell potential of 2.12 V. The use of a Zn-containing anode can be advantageous, for example, due to its relatively low cost (e.g., $3/kg), high gravimetric and volumetric capacity, and/or high overpotential for $H_2$ evolution (if, for example, water is used as a one of the liquids). A $Cl_2$-containing cathode can be advantageous, for example, due to its high specific capacity (e.g., 755 mAh/g, which can be 2.25 times that of $Br_2$) and/or its relatively low cost (compared to, for example, $Br_2$). Previously, the use of $Cl_2$ cathodes has been challenging, for example, due to difficulties in the storage of $Cl_2$ (which is a toxic gas at room temperature) and difficulties in containment (due to its high reactivity). Certain of the embodiments described herein overcome these challenges.

Figure 2:
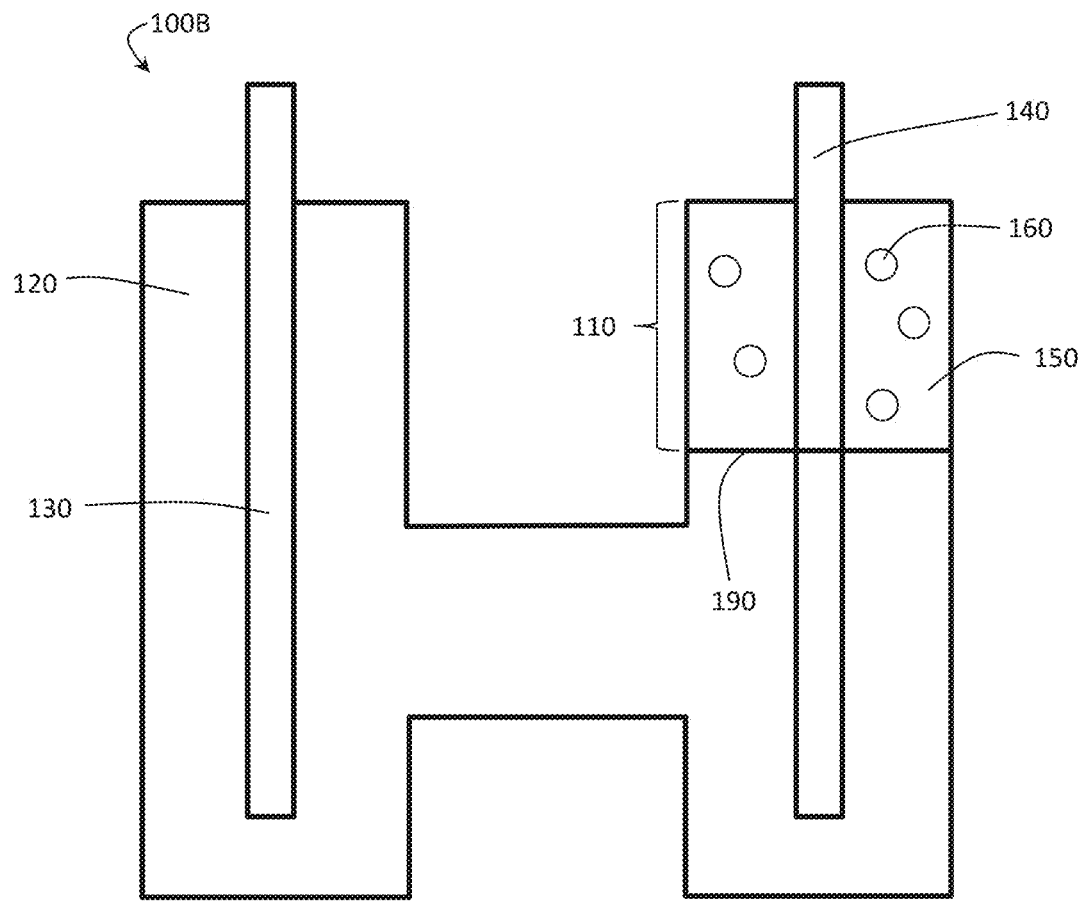
FIG. 2 is, in accordance with some embodiments, a cross-sectional schematic illustration of an electrochemical cell.

In one set of embodiments, the electrochemical cell is a zinc metal/$Cl_2$ battery. Referring to FIGS. 1-2, for example, in some embodiments, first region 110 comprises $Cl_2$ in $CCl_2$ and second region 120 comprises a solution of $ZnCl_2$ in water (e.g., a saturated solution of $ZnCl_2$ in water). Water and $CCl_2$ are immiscible, which leads to the formation of liquid-liquid interface 190. In some embodiments, electronically conductive material 140 (e.g., a carbon cathode) carries out the chlorine redox reactions at the interface of the $CCl_4$ and $ZnCl_2$ in water. A zinc metal anode can be used as electronically conductive material 130. In some embodiments, $Cl_2$ gas that is produced is dissolved and stored in $CCl_4$. In this embodiment, no membranes are necessary to separate the redox active species, as they are separated by the immiscible liquids. In addition, discharged state assembly can be provided with just $ZnCl_2$ and $CCl_4$ (without $Cl_2$), which can advantageously avoid the direct use of chlorine gas. This "self-assembling" design can enhance the safety of the device.

Figure 4A:
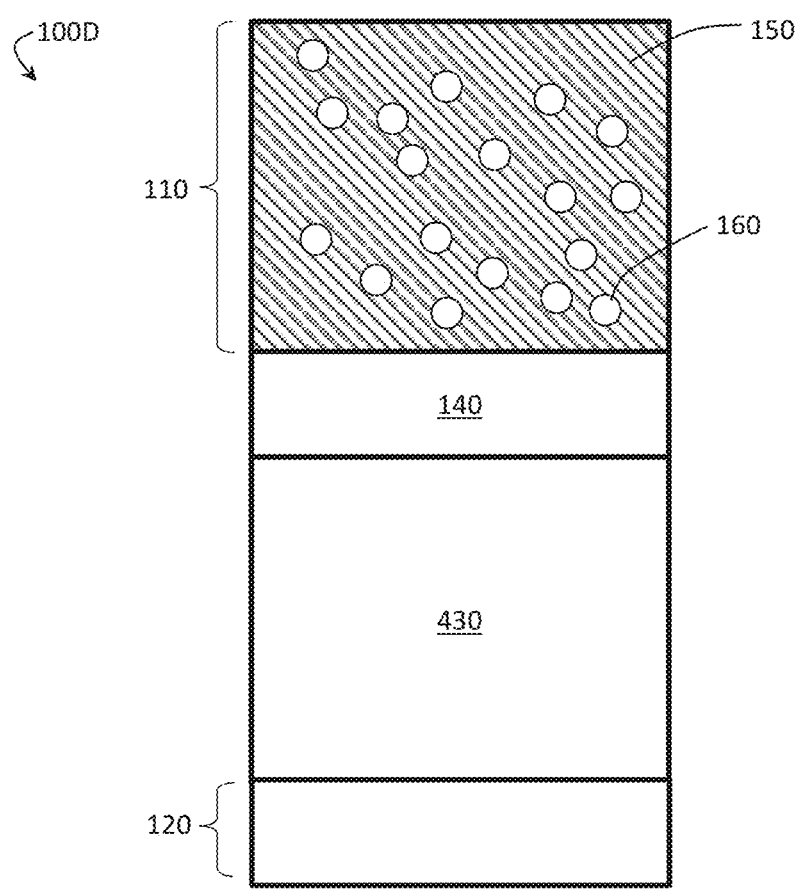
FIG. 4A is a cross-sectional schematic illustration of an electrochemical cell, according to certain embodiments.

In one set of embodiments, the electrochemical cell is an iron metal/$Cl_2$ battery. Referring to FIGS. 1-2, for example, in some embodiments, first region 110 may comprises $Cl_2$ in $CCl_2$ and second region 120 comprises a solution of $FeCl_2$ in water (e.g., a saturated solution of $FeCl_2$ in water). Water and $CCl_2$ are immiscible, which leads to the formation of liquid-liquid interface 190. In some embodiments, electronically conductive material 140 (e.g., a carbon cathode) carries out the chlorine redox reactions at the interface of the $CCl_4$ and $FeCl_2$ in water. A zinc metal anode can be used as electronically conductive material 130. In some embodiments, $Cl_2$ gas that is produced is dissolved and stored in $CCl_4$. In this embodiment, no membranes are necessary to separate the redox active species, as they are separated by the immiscible liquids. In addition, discharged state assembly can be provided with just $FeCl_2$ and $CCl_4$ (without $Cl_2$), which can advantageously avoid the direct use of chlorine gas. This "self-assembling" design can enhance the safety of the device. The low cost of iron can make attractive such an embodiment. In some embodiments, an iron-containing electrochemical cell may be used in a flow or hybrid flow architecture to mitigate lower solubility of iron chloride (e.g., $FeCl_2$), for example, when compared to zinc chloride. In some embodiments, an electrochemical cell may include a solid (e.g., a solid electrolyte, such as a polymer electrolyte) between the first region and the second region. One example of such an arrangement is shown in electrochemical cell 100D of FIG. 4A. In FIG. 4A, first region 110 and second region 120 may be in electrochemical communication via solid electrolyte 430 located between first region 110 and second region 120. First region 110 may further comprise liquid 150 (e.g., a non-polar liquid) and electroactive species 160, as well as electronically conductive material 140. Electroactive species 160 may pass through electronically conductive material 140 upon a redox event and migrate towards second region 120. In some embodiments, second region 120 may be or comprise an alkali metal (e.g., lithium metal, sodium metal, potassium metal).

The embodiments described with relation to FIG. 4A may be suitable, for example, for an alkali-halogen battery. As a non-limiting example, first region can include the non-polar liquid carbon tetrachloride and the electroactive species can be chlorine gas dissolved in the carbon tetrachloride. The electronically conductive material can be a porous carbon electrode, and the first region and the second region can be in electrochemical communication via a solid electrolyte positioned between the two regions. The second region can include a solid alkali metal electrode or current collector, such as lithium metal, and the redox reaction of the electrochemical cell may comprise $Cl_2+2Li \rightleftharpoons LiCl_2$ (theoretical energy density 2756 Wh/kg (no Li excess); 2077 Wh/kg (3 times Li excess)).

Figure 4B:
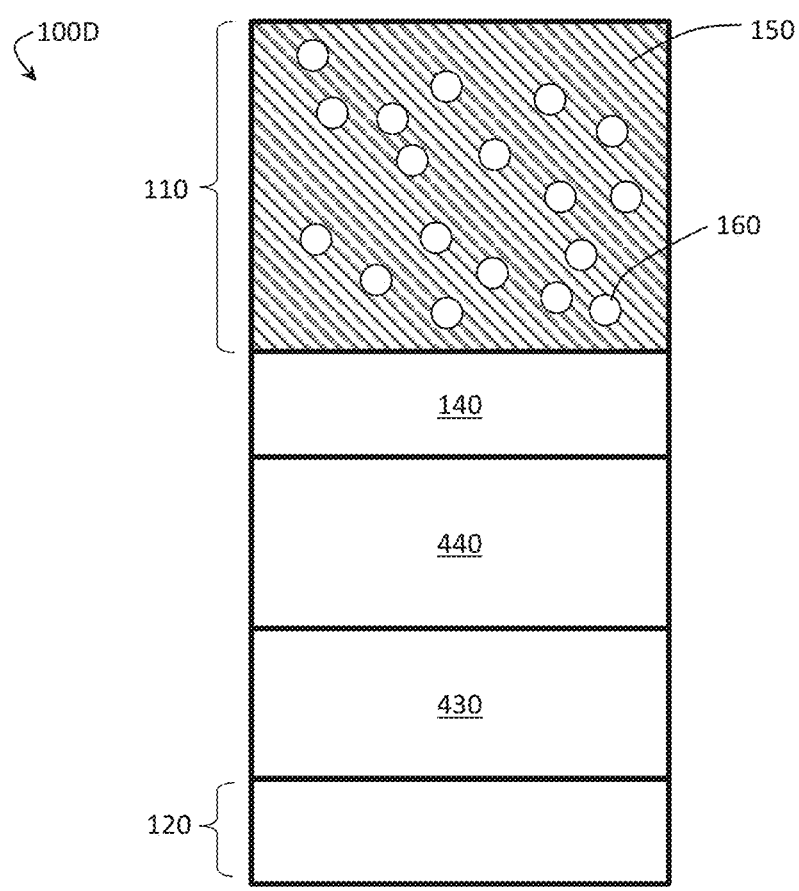
FIG. 4B is a cross-sectional schematic illustration of an electrochemical cell including a solid electrolyte and a liquid electrolyte, according to certain embodiments.

In some embodiments, an electrochemical cell may include a solid (e.g., a solid electrolyte, such as a polymer electrolyte) and may also include a liquid (e.g., a liquid electrolyte) between the first region and the second region. An example of such an arrangement is shown in electrochemical cell 100D of FIG. 4B. In FIG. 4B, first region 110 and second region 120 may be in electrochemical communication via liquid electrolyte 440 located between first region 110 and second region 120. First region 110 may further comprise liquid 150 (e.g., a non-polar liquid) and electroactive species 160, as well as electronically conductive material 140. Electroactive species 160 may pass through electronically conductive material 140 upon a redox event and migrate towards second region 120. In some embodiments, second region 120 may be or comprise a metal (e.g., an alkali metal, such as lithium metal, sodium metal, potassium metal; a transition metal, such as iron). In some embodiments, a solid electrolyte, such as solid electrolyte 430, may be disposed between second region 120 and liquid electrolyte 440. In such embodiments, the solid electrolyte may act as a barrier to protect the second region (e.g., an electrode within the second region) from direct contact with the liquid electrolyte.

The embodiments described with relation to FIG. 4B may be suitable, for example, for an alkali-halogen battery. As a non-limiting example, first region can include the non-polar liquid carbon tetrachloride and the electroactive species can be chlorine gas dissolved in the carbon tetrachloride. The electronically conductive material can be a porous carbon electrode, and the first region and the second region can be in electrochemical communication via a liquid electrolyte and a solid electrolyte positioned between the two regions. The second region can include a solid alkali metal electrode or current collector, such as lithium metal, and the redox reaction of the electrochemical cell may comprise $Cl_2 + 2Li \rightleftharpoons LiCl_2$ (theoretical energy density 2756 Wh/kg (no Li excess); 2077 Wh/kg (3 times Li excess)). The liquid electrolyte, as one example, can be a saturated aqueous solution of $LiCl_2$ and the solid electrolyte, as one example, can be a lithium solid electrolyte, such as lithium aluminum titanium phosphate (LATP).

The following examples are intended to illustrate certain embodiments of the present invention, but do not exemplify the full scope of the invention.

Example 1

This example describes a metal-halogen (e.g., $Cl_2/ZnCl_2$) battery using immiscible solvents.

With a decreasing reliance on fossil fuels and increasing availability of low-cost renewable electricity, energy storage technologies need to be developed to mitigate the intermittency of renewable electricity generation. Without storage, electricity demand must be met by an instantaneous electricity generation. This can place a lot of stress on our existing grid, particularly in the case of a full renewable electricity future as there is less control over its availability. With storage, however, the instantaneously generated electricity can be supplemented with the release of stored energy to meet the electricity demand placed on the grid.

A battery using zinc and chlorine as its redox active species has the potential to meet the requirements currently expected for a long-duration grid-scale energy storage solution. From its standard half-cell potentials (anode: $Zn^{2+}+2e^- \rightleftharpoons Zn(s)$; $E^0=-0.76V$ vs SHE; cathode: $2Cl^- \rightleftharpoons Cl_2(g)+2e^-$; $E^0=1.36V$ vs SHE), we see that a potential zinc-chlorine battery has a thermodynamic voltage of ~2.1V. A zinc metal anode has a low cost, a high gravimetric and volumetric capacity, and high overpotential for hydrogen evolution. A chlorine cathode likewise has a high specific capacity, at 755 mAh/g, which is roughly 2.25 times that of bromine, while also having a low cost. However, the use of chlorine as a redox active species has previously been limited due to problems related to its containment, namely that chlorine at room temperature and at atmospheric pressure is a toxic gas. Additionally, it is highly reactive and thus limits the options available for containment materials.

Chlorine has other advantages over bromine as an electroactive species, besides lower cost and higher specific capacity. In a density-based, self-assembling battery of the present design, the higher density of bromine requires that the aqueous solution be above the non-polar solvent. As bromine, with a density of ~3.1 g/cm³ in its pure form, it sinks and dissolves into the non-polar solvent. In contrast, in a chlorine-based system, the buoyancy of chlorine gas leads to it rising in the aqueous solution, allowing the non-polar solvent to be positioned above the aqueous solution when the second phase comprises water, such that the chlorine gas can be captured. However, because the density of an aqueous solution increases with higher concentrations of bromide salts, there is a maximum bromide salt concentration dictated by the non-polar solvent of choice before the densities become similar and density-based separation may no longer occur. In the case in which the electroactive species comprises chlorine gas and/or chloride, the usable concentration of chlorine gas is not limited by this constraint. Additionally, chloride salts generally have higher solubilities in water than bromide salts. These two factors allow for a much higher concentration of active species in aqueous solution for chlorine-based systems than bromine-based systems, and thus allow for a higher theoretical energy density in chlorine-based systems. The cost of metal chloride salts are also lower than that of the corresponding metal bromide salts when the metal is the same in both. Additionally, the chlorine standard electrode potential is ~0.3 V greater than that of bromine, which allows for higher cell voltage and thus higher theoretical energy density.

A membraneless self-assembling $Zn-Cl_2$ battery, as described in this example, circumvents the aforementioned problems by storing chlorine in $CCl_4$, which decreases the health hazards associated with this battery, and also allows for easier containment. The battery concept in this example includes a catholyte and anolyte separated due to their immiscibility. For this battery, the carbon cathode carries out the chlorine redox reactions at the interface of the $CCl_4$ and $ZnCl_2$ in water. The produced chlorine gas during charging is dissolved and stored in a separate, immiscible electrolyte, namely $CCl_4$. The $CCl_4$ solution has a lower density than the saturated $ZnCl_2$ solution, at 1.59 g/cm³ and 2 g/cm³ respectively, allowing for the $CCl_4$ to act as a carrier for rising $Cl_2$ gas. While $CCl_4$ has a high solubility of $Cl_2$, it does not dissolve $Cl^-$ ions due to its non-polar nature. This solution's solubility of $Cl_2$ also increases with decreasing temperature. On the other side of the battery, Zn is plated and stripped on a current collector (such as zinc metal), taking $Zn^+$ ions from $ZnCl_2$ in water. Water likewise has a high solubility of $ZnCl_2$, at 11.7 mol/L at room temperature, while not having a significant dependence of solubility on temperature. Due to separation by immiscible electrolytes, no membrane is necessary to prevent crossover of redox active species. When this battery concept is assembled in a discharged state, it can be done solely with saturated aqueous $ZnCl_2$ and with chlorine-free $CCl_4$ for a safe, self-assembling design. This battery concept can also be used with a stationary non-flow, traditional flow battery, or hybrid flow battery (wherein only one electrolyte flows) design.

Prior attempts at making zinc-halogen batteries have primarily focused on bromine as the halogen of choice. This chemistry has been typically embodied as a redox flow battery. It uses a liquid catholyte and anolyte, requiring a selective membrane to separate the redox active species. In these batteries, the posolyte is bromine liquid, which is toxic, expensive, and volatile, albeit easier to operate than gaseous chlorine. In comparison, work on zinc-chlorine has been relatively sparse, with most work being done by Energy Development Associates in the 1980s. Their battery used an aqueous posolyte that forms chloride hydrates. In contrast, this example does not use an aqueous posolyte and does not form chloride hydrates.

One possible application for this battery concept is long-duration, large-scale energy storage. Compared to other battery technologies, this zinc-chlorine cell has a more moderate storage media capital cost. It is believed that this concept should be able to meet the technical performance metrics proposed by the Department of Energy's ARPA-E.

Figure 5A:
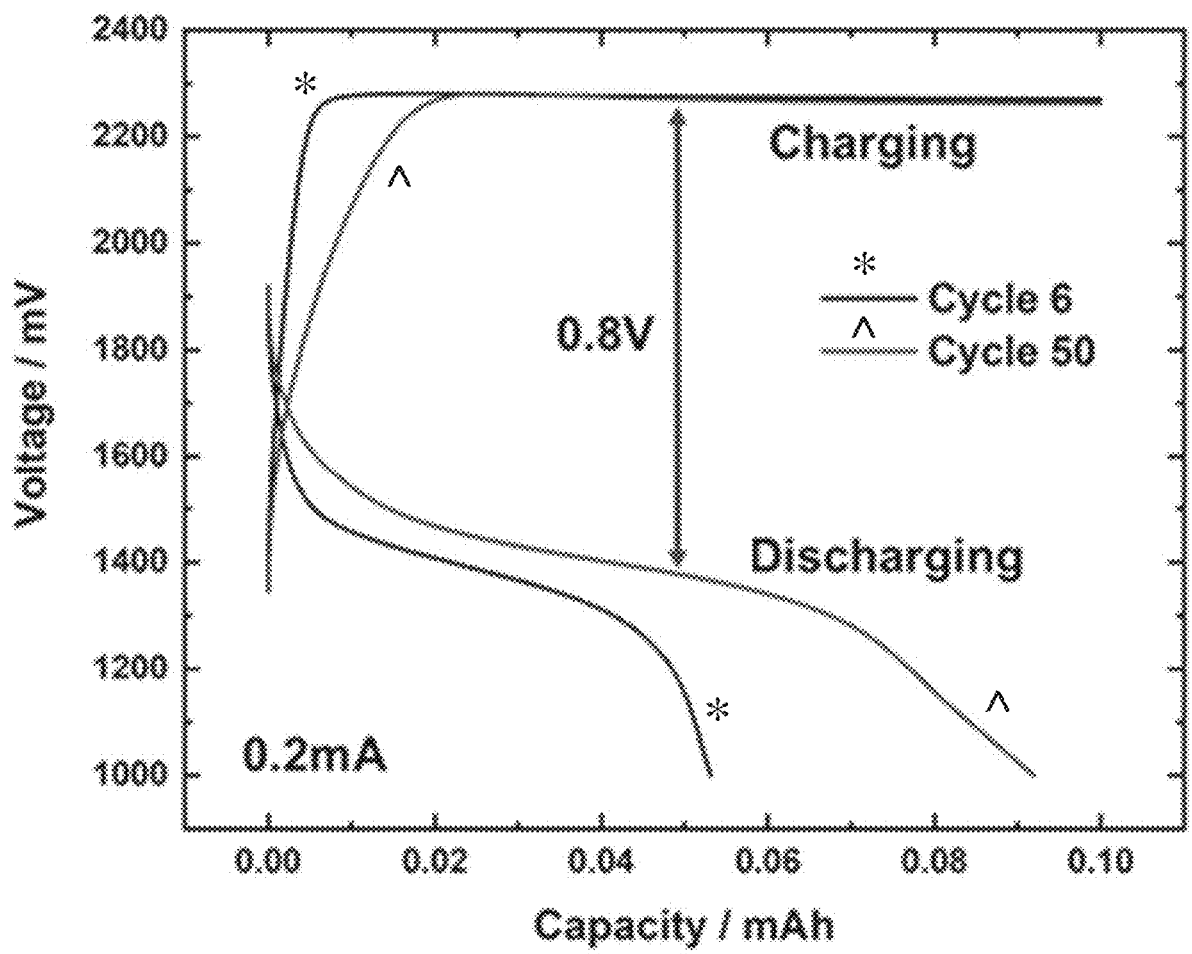
FIGS. 5A-5B show plots of H-cell galvanostatic charge and discharge cycles, according to one set of embodiments.
Figure 5B:
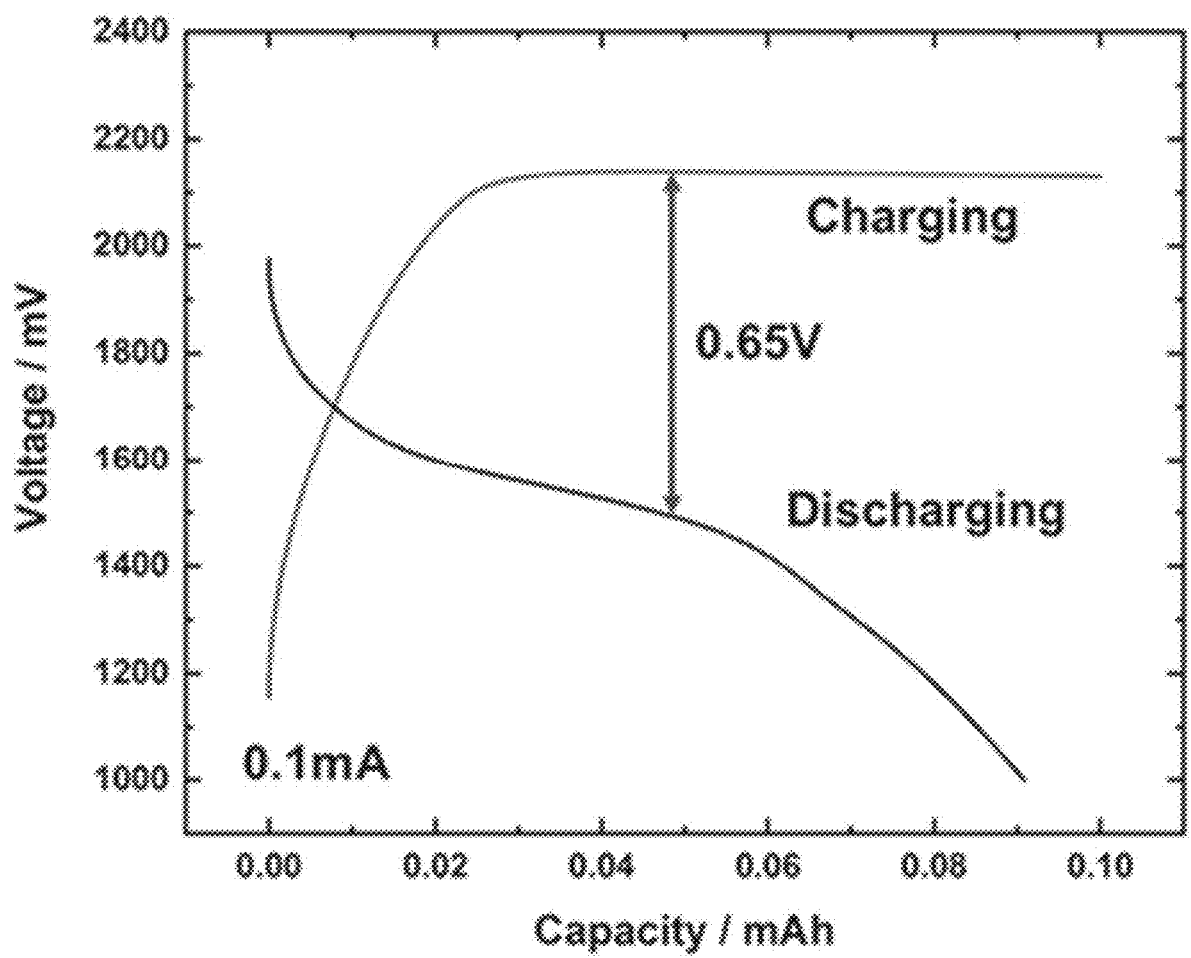
Figure 6:
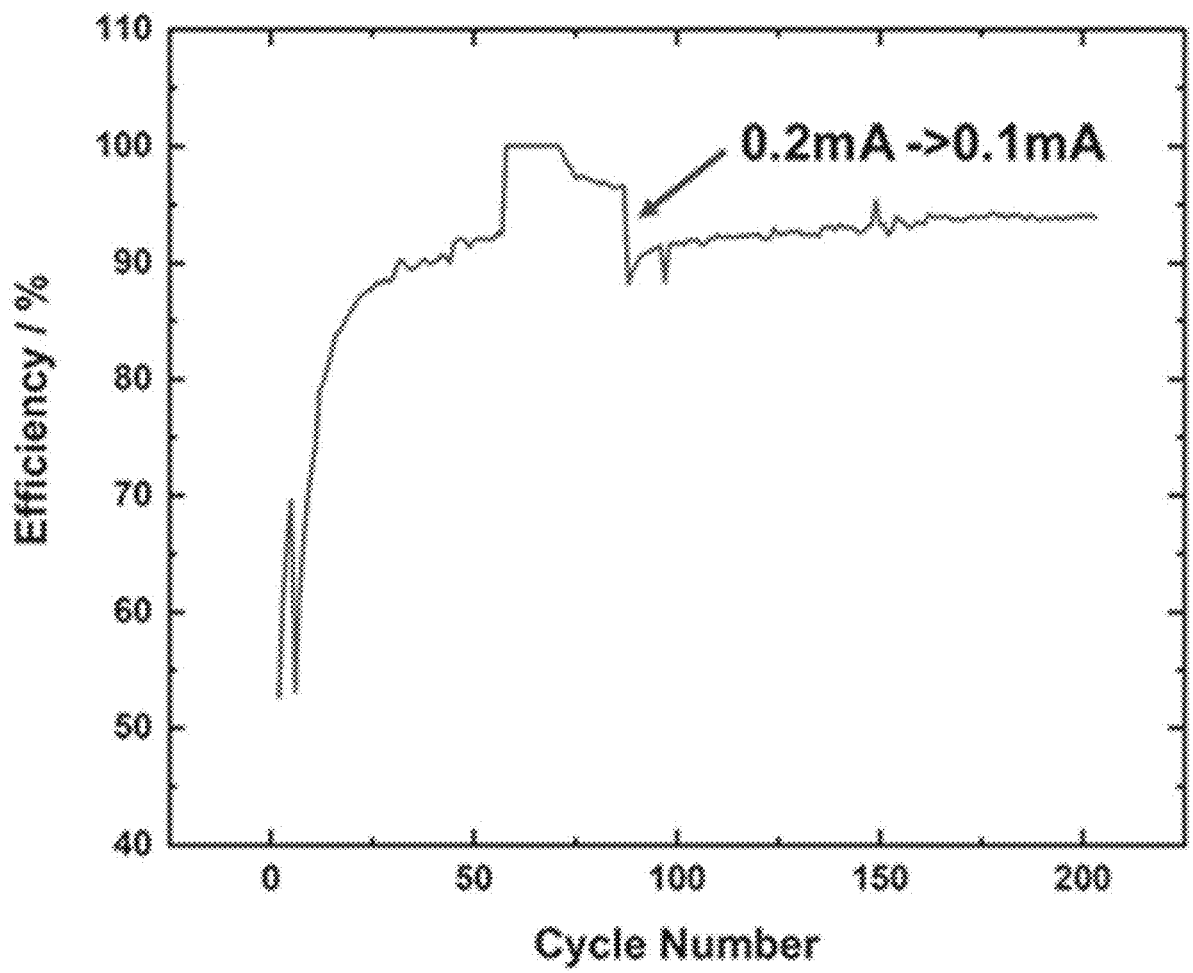
FIG. 6 shows a plot of the columbic efficiency as a function of cycle number, according to one embodiment.

Proof of concept of a Zn—$Cl_2$ battery has been demonstrated by using both an H-cell (see, e.g., FIG. 2) and a stacked cell configuration (see, e.g., FIG. 1). In the H-cell configuration, $Cl_2$ is kept in the top component of one side of the cell. A graphite rod was used as the cathode material. Galvanostatic cycling of this cell was carried out by employing a constant current during charge and discharge (FIGS. 5A-5B). Due to the size of the cathode, the cell required preliminary charging to increase the amount of $Cl_2$ accessible to the electrode, hence the increase in discharge capacity over the first 20 cycles, as shown in FIG. 6. These cycles had a capacity cutoff at 0.1 mAh for charge and a voltage cutoff at 1V for discharge. This H-cell's coulombic efficiency increased during the first 20 cycles, then stabilized at around 92%, and stable cycling was observed for about 200 cycles.

Figure 7:
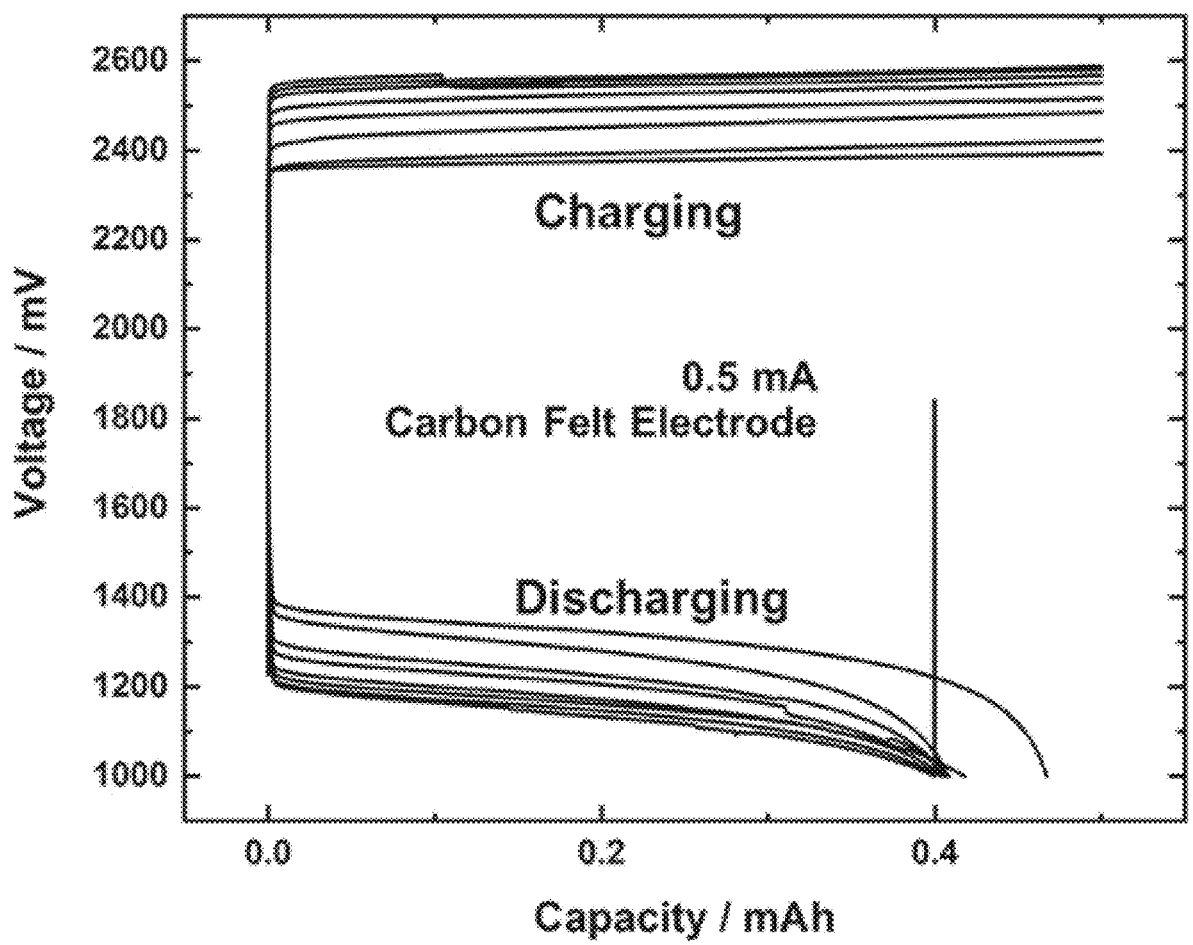
FIG. 7 shows a plot of charge/discharge cycling in a stack cell configuration where the columbic efficiency increases by more than 80% in three cycles, according to one set of embodiments.

To increase the active area of the cathode at the $H_2O$—$CCl_4$ interface, a stacked cell configuration was used and a porous carbon cathode was employed. Cycling using this stacked cell had similar cycling parameters, with a capacity cutoff during charging at 0.5 mAh and a voltage cutoff during discharging at 1V. This cell had a coulombic efficiency that reached 80% in just three cycles (FIG. 7), which indicates that the cathode with higher surface area could improve the initial production of $Cl_2$.

Figure 8:
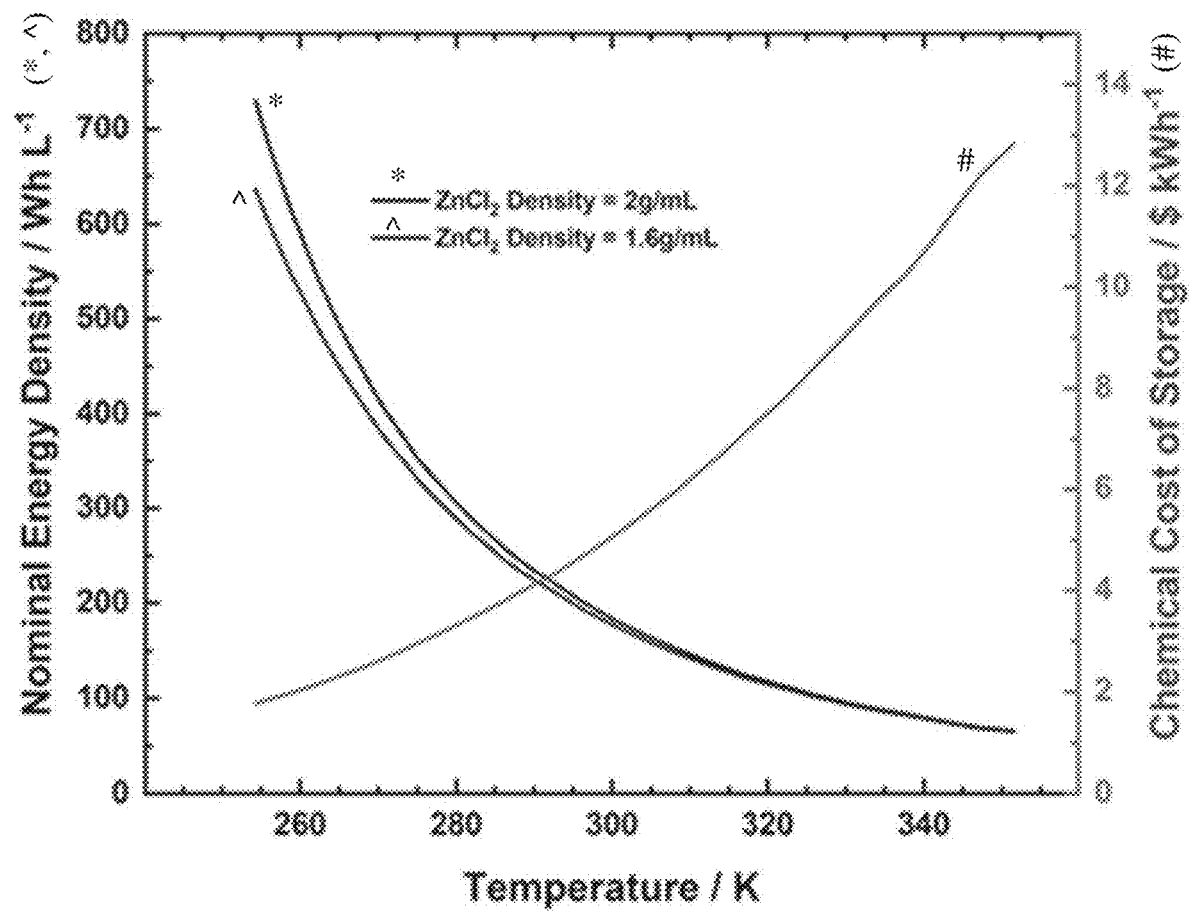
FIG. 8 shows a plot of nominal energy density and chemical cost as a function of temperature, according to one set of embodiments.
Figure 9A:
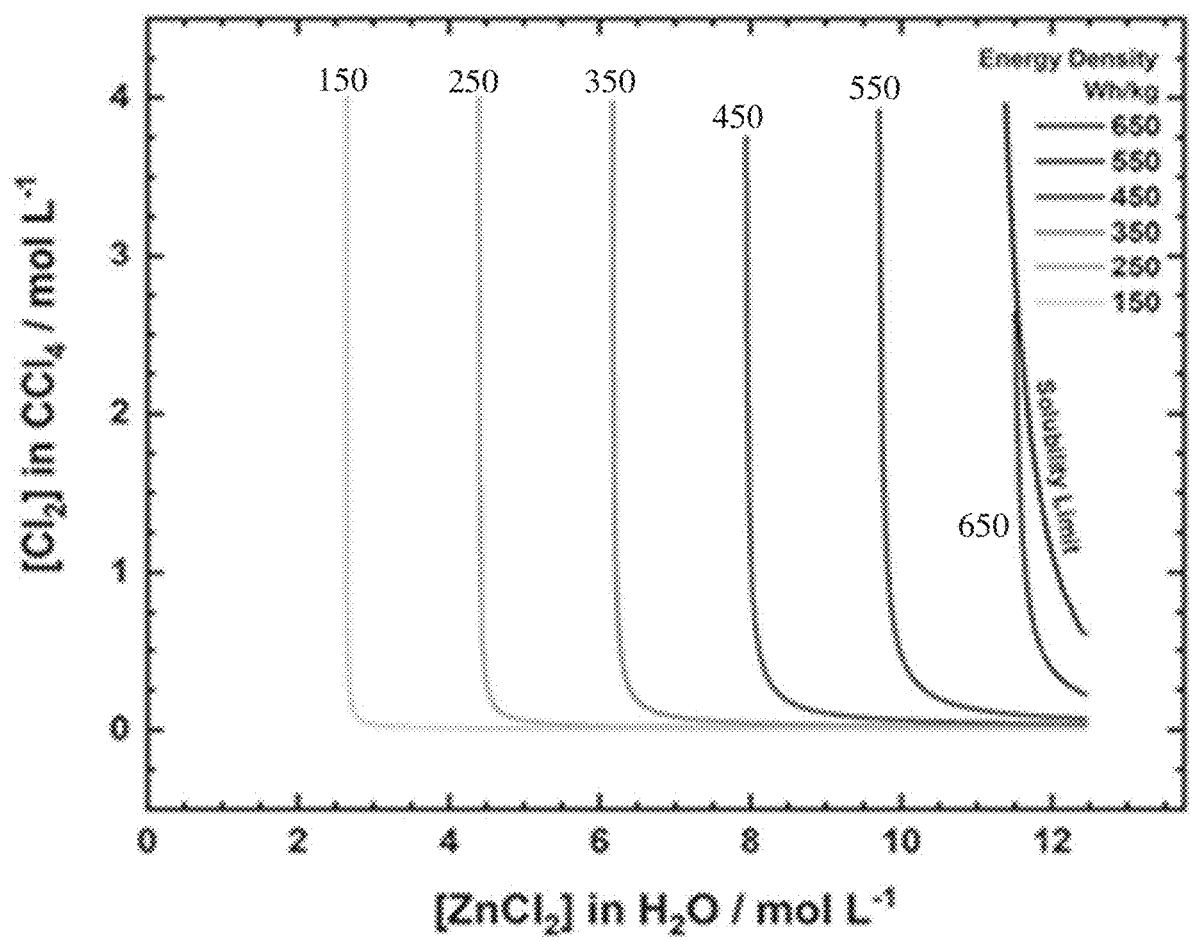
FIGS. 9A-9B show plots of energy densities as a function of solution concentration, according to one set of embodiments.
Figure 9B:
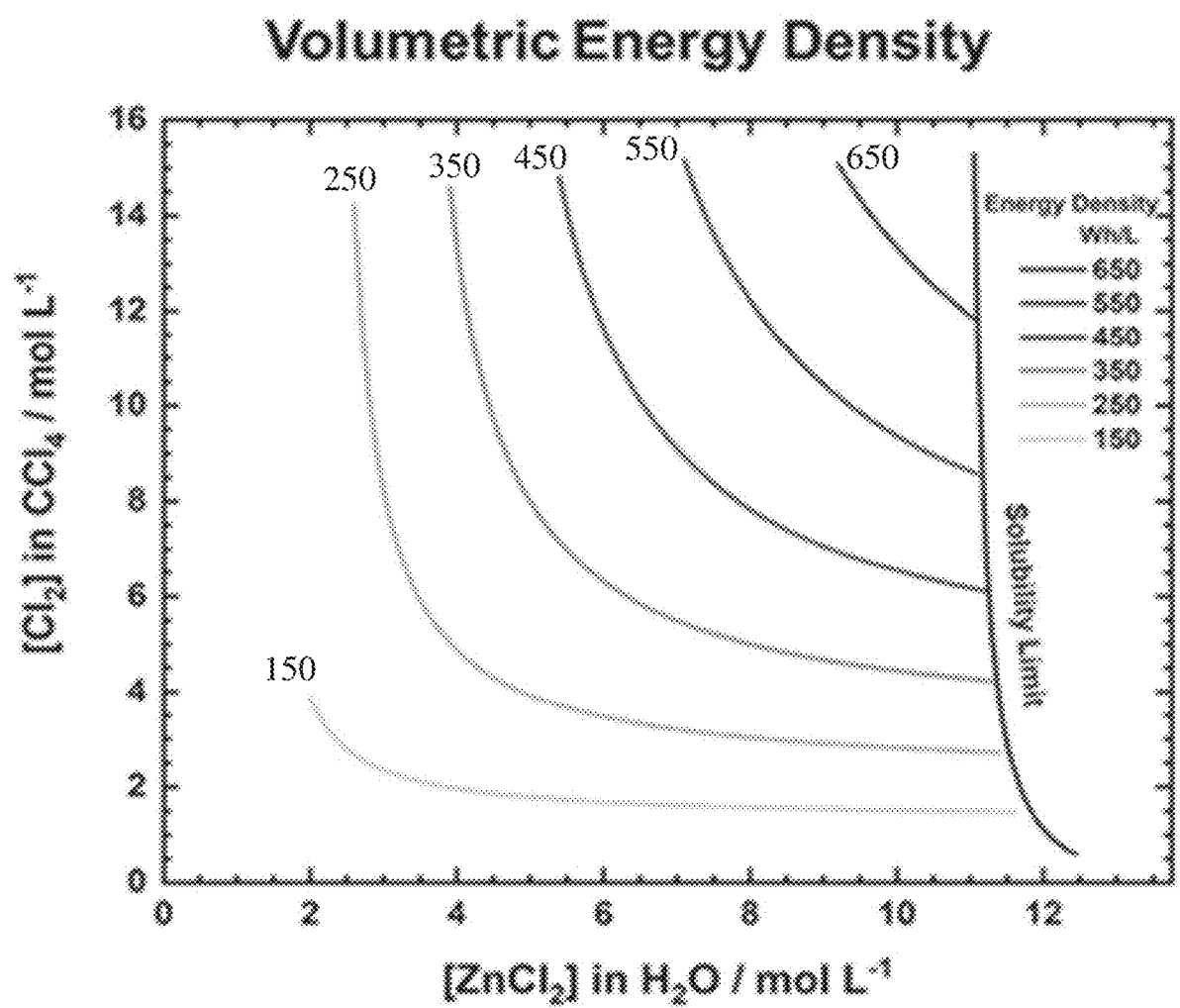

Preliminary technoeconomic analysis suggests that the chemical cost of storage at room temperature is competitive for long-duration storage, with the added benefit of the membraneless design potentially lowering the stack/reactor cost. Additionally, the chemical cost of storage decreases at low temperature, as a higher nominal energy density is achievable (FIG. 8). This is because the $Cl_2$ concentration in $CCl_4$ increases significantly at a lower temperature, while the $ZnCl_2$ solubility in $H_2O$ shows a negligible dependency on temperature at this range. At low temperatures, a theoretical energy density of about 650 Wh/kg and 700 Wh/L are accessible (FIGS. 9A-9B). In conjunction, these facts point to this concept as an attractive option for low-temperature battery applications.

This architecture is not limited to the Zn—$Cl_2$ system, and it is believed that many chemistries can take advantage of a membraneless architecture using two immiscible fluids where one of them is used as a storage mechanism for a redox active compound. Additionally, the use of a porous electrode at the interface may be used to allow for more ready dissolution into the electrolyte of choice. This architecture should be applicable for other zinc-halogen batteries (e.g., zinc-bromide, zinc-iodine), for general metal-halogen batteries (e.g., alkali such Li, Na, K; alkaline earth such as Mg and Ca; and other metals such as Fe, Bi, Ce, and Al), and potentially for a polysulfide-halogen battery. One chemistry that is of particular interest is the alkali metal-halogen battery option, wherein the halogen can be stored in a catholyte such as $CCl_4$ and a solid or polymer electrolyte is used for the anode. The extremely high theoretical energy density makes it a potential alternative for future energy storage, with a lithium-chloride battery having a theoretical energy density of 2756 Wh/kg assuming no lithium excess or 2077 Wh/kg with three times lithium excess.

Example 2

This example describes a metal-halogen battery using immiscible solvents using chlorine and iron.

Figure 10:
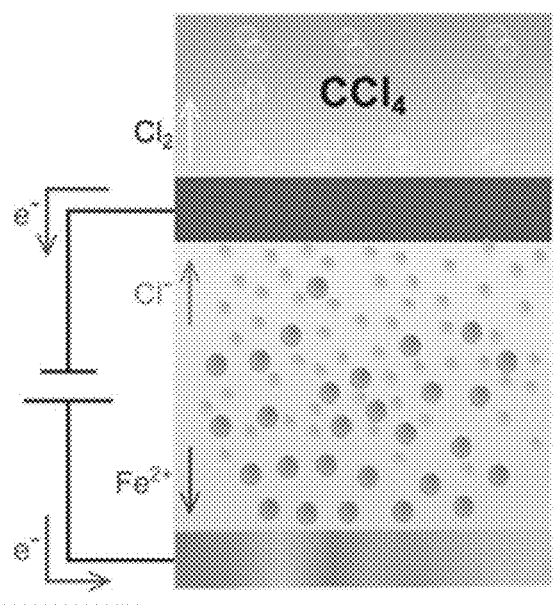
FIG. 10 is a cross-sectional schematic illustration of a chlorine-iron electrochemical cell, according to certain embodiments.

A battery using iron and chlorine as its redox active species has the potential to meet the requirements currently expected for a long-duration grid-scale energy storage solution. Such a battery is illustrated in FIG. 10. An iron electrode serves as the substrate on which iron plating and stripping occurs. At the second electrode, iron is immersed within an aqueous, saturated iron chloride solution, acting as the source of iron ions for the anode reaction and chloride ions for the cathode reaction. From its standard half-cell potentials (anode: $Fe^{2+}+2e^- \rightleftharpoons Fe(s)$; $E^0=-0.44V$ vs SHE; cathode: $2Cl^- \rightleftharpoons Cl_2(g)+2e^-$; $E^0=1.36V$ vs SHE), it can be shown that a potential iron-chlorine battery has a thermodynamic voltage of ~1.8V. An iron metal anode has a low cost, and a high gravimetric and volumetric capacity. A chlorine cathode likewise has a high specific capacity, at 755 mAh/g, which is roughly 2.25 times that of bromine, while also having a low cost. However, the use of chlorine as a redox active species is generally limited due to problems revolving around its containment, namely that chlorine at room temperature and at atmospheric pressure is a toxic gas. Additionally, it is highly reactive and thus limits the options available for containment.

A membraneless self-assembling Fe—$Cl_2$ battery, as described in this example, circumvents the aforementioned problems by storing chlorine in $CCl_4$, which decreases the health hazards associated with this battery, and also allows for somewhat easier containment. The battery concept in this example include a catholyte and anolyte separate due to their immiscibility. For this battery, the carbon cathode carries out the chlorine redox reactions at the interface of the $CCl_4$ and $FeCl_2$ in water. The produced chlorine gas during charging is dissolved and stored in a separate, immiscible electrolyte, namely $CCl_4$. The $CCl_4$ solution has a lower density than the saturated $FeCl_2$ solution, allowing for the $CCl_4$ to act as a carrier for rising $Cl_2$ gas. While $CCl_4$ has a high solubility of $Cl_2$, it does not dissolve $Cl^-$ ions due to its non-polar nature. This solution's solubility of $Cl_2$ also increases with decreasing temperature. On the other side of the battery, Fe is plated and stripped on a current collector (such as Fe metal), taking $Fe^+$ ions from the $FeCl_2$ in water. Water likewise has a high solubility of $FeCl_2$ at room temperature, while not having a significant dependence of solubility on temperature. Due to separation by immiscible electrolytes, no membrane is necessary to prevent crossover of redox active species. When this battery concept is assembled in a discharged state, it can be done solely with saturated aqueous $FeCl_2$ and with chlorine-free $CCl_4$ for a safe, self-assembling design. This battery concept can also be used with a stationary non-flow, traditional flow battery, or hybrid flow battery (wherein only one electrolyte flows) design.

Example 3

This example describes a lithium-chlorine battery, which is generalizable to other alkali metals including sodium and potassium. In this example, an aqueous lithium chloride electrode is used, similar to the zinc chloride electrode in Example 1 and the iron chloride example in Example 2. However, in order to use lithium metal as the other electrode, the lithium metal must be prevented from contacting the aqueous electrode, due to the high reactivity of lithium with water. A layer of solid electrolyte is used to server this function. In this example, an intervening layer of a solid electrolyte with a high lithium conductivity is used, such as well-known compounds including lithium-aluminum-titanium-phosphate (LATP) or lithium-lanthanum-zirconium-oxide (LLZO). This design has the lithium metal as the second electrode, coated with said solid electrolyte, allowing the solid electrolyte to be in contact with a saturated aqueous lithium chloride solution forming the first electrode, and allows for transport of the lithium ions between the solution and the lithium electrode, on which lithium plating and stripping occurs. The lithium chloride solution also acts as the source of chloride ions for the cathode reaction. Of lower density, and residing on top of the aqueous solution, is the first electrode, comprising a non-polar solvent (e.g. $CCl_4$) of lower density. At the interface of the two solutions, there resides a porous electronically conductive electrode (e.g., carbon) on which the chlorine evolution and reduction occurs.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
   a first region comprising a first electrode active material; and
   a second region in electrochemical communication with the first region, the second region comprising a second electrode active material;
   wherein:
   the first region comprises a non-polar liquid;
   the first electrode active material comprises an electroactive species within the non-polar liquid, the electroactive species present in the non-polar liquid at a concentration of at least 1 mMol;
   the second electrode active material comprises iron; and
   the electrochemical cell is configured such that, during at least one period of time during charging and/or discharging, a metallic iron electrode material is present.

2. An electrochemical cell, comprising:
   a first region comprising a first electrode active material; and a second region in electrochemical communication with the first region, the second region comprising a second electrode active material;

wherein:
the first region comprises a non-polar liquid;
the first electrode active material comprises an electroactive species comprising a dissolved gas within the non-polar liquid; and
the electrochemical cell is configured such that, during at least one period of time during charging and/or discharging, the dissolved gas is present in the non-polar liquid at a concentration of at least 1 mMol.

3. The electrochemical cell of claim 1, wherein the electroactive species within the non-polar liquid is substantially absent from the second region.

4. The electrochemical cell of claim 1, wherein at least one liquid-liquid phase boundary is present between the first region and the second region.

5. The electrochemical cell of claim 1, wherein the electroactive species is dissolved within the liquid in which it is contained.

6. The electrochemical cell of claim 1, wherein the electroactive species comprises a molecular species.

7. The electrochemical cell of claim 1, wherein the electroactive species comprises a dissolved gas.

8. The electrochemical cell of claim 1, wherein the electroactive species is present in the first region as a molecular species, and the second region comprises a corresponding metal salt and/or a corresponding solubilized ion.

9. The electrochemical cell of claim 8, wherein the electroactive species in the first region is $Cl_2$, and the corresponding solubilized ion in the second region is $Cl^-$.

10. The electrochemical cell of claim 1, further comprising an electronically conductive material between the first region and the second region.

11. The electrochemical cell of claim 10, wherein the electronic conductivity within the first region is less than $10^{-6}$ S/cm.

12. The electrochemical cell of claim 10, wherein the electronic conductivity within the second region is less than $10^{-6}$ S/cm.

13. The electrochemical cell of claim 10, wherein the electronically conductive material comprises carbon.

14. The electrochemical cell of claim 10, wherein the electronically conductive material comprises graphite.

15. The electrochemical cell of claim 1, wherein there is no membrane between the first region and the second region.

16. The electrochemical cell of claim 1, wherein the electroactive species comprises a diatomic halogen, oxygen gas ($O_2$), carbon dioxide ($CO_2$), and/or carbon monoxide (CO).

17. The electrochemical cell of claim 1, wherein the electroactive species comprises $F_2$, $Cl_2$, $Br_2$, and/or $I_2$.

18. The electrochemical cell of claim 1, wherein the non-polar liquid comprises $CCl_4$, $CS_2$, chloroform, dichloromethane, ethylbenzene, chlorotoluene, toluene, trichlorobenzene, dichlorobenzene, titanium tetrachloride, benzene, tetrachloroethylene, heptane, hexachloro-butadiene, and/or chromyl chloride.

19. The electrochemical cell of claim 1, wherein a product of an electrochemical reaction of the electroactive species within the non-polar liquid has a solubility of less than 1 g/L in the non-polar liquid.

20. The electrochemical cell of claim 1, wherein the electroactive species within the non-polar liquid comprises $Cl_2$, and a product of the electrochemical reaction is $Cl^-$.

* * * * *